May 31, 1932. A. N. BERGER ET AL 1,860,565
SECURING DEVICE FOR VEHICLES
Filed Nov. 21, 1931 2 Sheets-Sheet 2
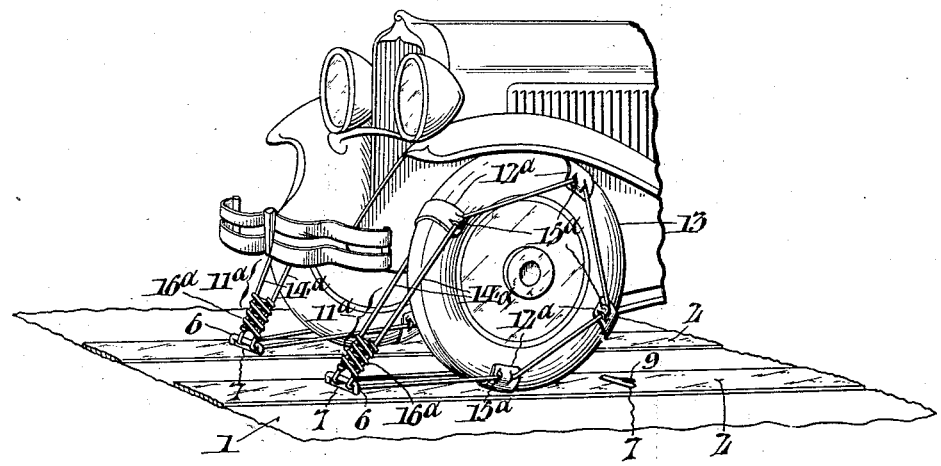
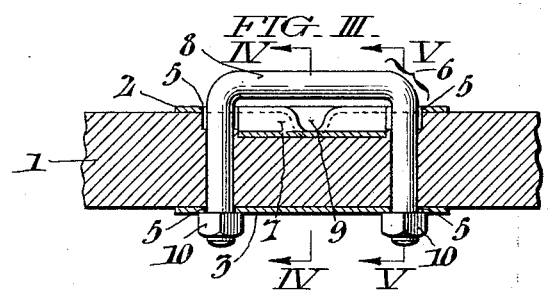
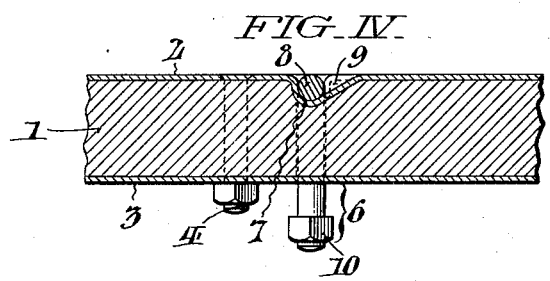
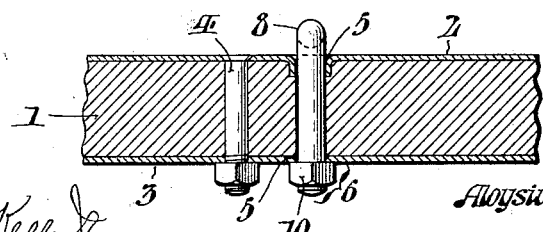

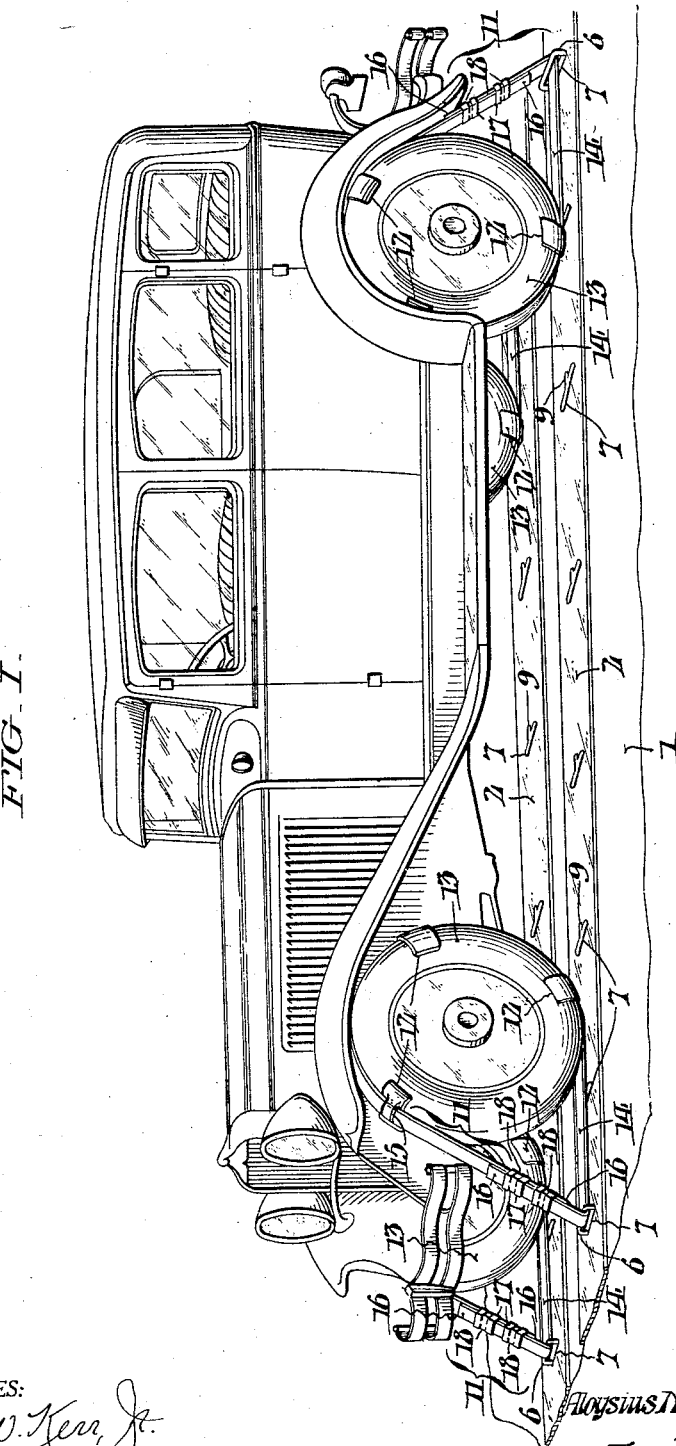

Patented May 31, 1932

1,860,565

UNITED STATES PATENT OFFICE

ALOYSIUS NICHOLAS BERGER AND PAUL SEEL, OF ALTOONA, PENNSYLVANIA

SECURING DEVICE FOR VEHICLES

Application filed November 21, 1931. Serial No. 576,502.

Our invention relates particularly to means for securing the wheels of a vehicle, such as an automobile, to the floor of a freight car, or other type of carrier on which the vehicle is transported, in order that the vehicle may be maintained in a fixed position on the carrier floor, regardless of the sudden stopping or starting of the carrier.

One object of our invention is to provide a securing device for vehicles in transit including anchorage members, which when not in use are adapted to drop by gravity to stored positions in the floor of a carrier, and which when so dropped will leave the floor of the carrier substantially unobstructed, and yet with the anchorage members ready for use without further preparation.

Another object is to provide a securing device of this nature which is adapted without change in equipment to accommodate vehicles having wheel bases of different length.

Further objects and advantages characteristic of our invention will become apparent from the description hereinafter of several embodiments or examples thereof, the description having reference to the accompanying drawings. Of the drawings:

Fig. I represents a perspective view of an automobile secured to a freight car floor by means of a wheel securing device embodying our invention.

Fig. II represents a fragmentary perspective view of the front end of an automobile to which a modified form of wheel securing device embodying our invention has been applied.

Fig. III represents a transverse cross section of a portion of the floor of a freight car illustrating a form of anchorage member contemplated by this invention.

Fig. IV represents a longitudinal cross section of a portion of the floor, taken as indicated by the lines IV—IV of Fig. III and showing the bolt dropped down in the depression in the tread plate; and, Fig. V represents a longitudinal section of a portion of the floor, taken as indicated by the lines V—V of Fig. III.

In the drawings, the floor or platform of a freight car is designated at 1, and upon the top surface of this floor or platform tread plates 2 are fastened and spaced apart to correspond to the tread width of the automobiles to be transported. At the underside of the floor or platform 1, as indicated in Fig. III, reinforcing plates 3 are fastened in positions opposite to the tread plates 2 by means of through bolts 4 with their heads countersunk in the tread plates, piercing both the tread plates 2 and the reinforcing plates 3.

Both the tread plates 2 and the reinforcing plates 3 are perforated at spaced intervals throughout their length as at 5, the holes being arranged in double rows. Within the holes 5 anchorage members 6 in the form of U-bolts are inserted, the anchorage members being so spaced, as indicated in Fig. I, as to accommodate vehicles having wheel bases of different length. Adjacent to each pair of holes 5 in the tread plates 2, depressions 7 are formed in the tread plates, which depressions accommodate the shank portions 8 of the U-bolts when they are not in use. Accordingly, each U-bolt 6 is adapted to drop by gravity into a depression 7 to a position in which the floor of the carrier is unobstructed and in which the top surface of the U-bolt is flush with the floor. At the central portion of each depression 7 in the tread plates 2, a longitudinal cavity 9 is formed, as shown in Fig. IV, to allow the U-bolt there seated to be conveniently grasped by the hand, so that it may be lifted from dropped position to an elevated position above the tread plate. Nuts 10 engaging the ends of the U-bolts beneath the carrier floor determine the extent to which the shank portions of the U-bolts may be raised above the tread plates.

Wheel securing members which cooperate with the U-bolts 6 to effect a wheel block, are comprehensively designated at 11. These wheel securing members 11, as shown in Fig. I, include tire guides 12 which are adapted to be spaced at intervals around the circumference of the front and rear wheels 13 of the vehicle, and straps 14 in the form of flat bands which pass through the tie guides 12 and around the shank portion 8 of certain of the U-bolts 6, the selection of the particular U-bolts 6 to be employed being determined by the wheel base of the particular vehicle which is being transported. The straps 14 at the front end of the vehicle extend from the front wheels 13 to the anchorage members 6 in the opposite direction from that in which the straps at the rear end of the vehicle extend from the rear wheels to the anchorage members, thus effecting a wheel block preventing movement of the vehicle with respect to the carrier floor.

The tire guides 12 preferably comprise U-shaped metal strips disposed transversely to the wheels and fitting over the tires with the straps 14 passing through slots 15 therein. Each strap 14 encircles a wheel 13 and forms a closed loop tautly drawn about the wheel and the corresponding anchorage member 6. To tie the ends 16 of the straps 14 together, we preferably employ means such as the mechanical seals shown at 17, which, when the straps have been stretched about the wheels 13, are punched as indicated at 18 so as to compress the ends together.

An alternate form of wheel securing means is indicated at 11a in Fig. III. In this example, the strap comprises a pair of wires 14a drawn through slots 15a in tire guides 12a. The wires 14a pass around the shank portions 8 of the U-bolts 6 and have their ends 16a coiled around each other in such manner as to form tautly drawn loops.

The operation of the securing device of our invention will be readily understood from the above description. It is to be noted that the provision of anchorage members at regular spaced intervals along the tread plates permits a selection of points of anchorage so that automobiles of different wheel bases may be accommodated on the carrier without change in the equipment used for securing them to the floor. Moreover, the provision of parallel tread plates at the top of the floor, together with similar reinforcing plates at the underside of the floor, materially reduces wear and results in other obvious advantages with regard to the maintenance of the anchorage members in proper working order.

While we have described in some detail one form or embodiment which this invention may take, it will be apparent, especially to those skilled in the art, that various changes may be made in the form of vehicle securing device herein described and illustrated without departure from the spirit of the invention as defined in the appended claims.

Having thus described our invention, we claim:

1. A securing device for use in transporting vehicles comprising tread plates fastened to the platform of a carrier, anchorage members mounted on said tread plates, said anchorage members dropping into depressions in said tread plates when not in use, and wheel securing members adapted to pass around front and rear wheels of the vehicle to be transported and to extend in opposite directions to said anchorage members to effect a wheel block.

2. A securing device for use in transporting vehicles comprising parallel tread plates fastened to the platform of a carrier and spaced apart to correspond to the tread width of the vehicle to be transported, anchorage members attached to said tread plates at intervals therealong to accommodate vehicles having wheel bases of different length, said anchorage members dropping into depressions in said tread plates when not in use, and wheel securing members adapted to pass around front and rear wheels of the vehicle and to extend in opposite directions to certain of said anchorage members to effect a wheel block.

3. A securing device for use in transporting vehicles comprising tread plates perforated at intervals and having cavities adjacent to the perforations, said tread plates being fastened to the platform of the carrier, U-bolts passing through the perforations in said tread plates, said U-bolts dropping into said cavities when not in use, and said cavities being formed to allow the U-bolts to be conveniently grasped by the hand when so dropped, and wheel securing straps adapted to encircle front and rear wheels of the vehicle to be transported, and to extend in opposite directions to said U-bolts to effect a wheel block.

4. A securing device for use in transporting vehicles comprising perforated tread plates fastened to the top surface of the platform of the carrier and spaced apart to correspond to the tread width of the vehicles to be transported, reinforcing plates fastened to the underside of the platform opposite said tread plates, U-bolts piercing said tread plates and reinforcing plates, said U-bolts dropping into depressions in said tread plates when not in use, and wheel securing straps adapted to encircle front and rear wheels of the vehicle to be transported and to extend in opposite directions to said U-bolts to effect a wheel block.

5. A securing device for use in transporting vehicles comprising tread-plates fastened to the platform of a carrier, U-bolts mounted on said tread plates, said U-bolts dropping into depressions in said tread plates when not in use, tire guides adapted to be spaced at intervals around the circumference of the front and rear wheels of the vehicle to be transported, and wheel securing straps passing through said tire guides and around said U-bolts to form closed loops.

6. A securing device for use in transporting vehicles comprising tread plates fastened to the platform of a carrier, U-bolts mounted on said tread plates, said U-bolts dropping down into depressions in said tread plates when not in use, and wheel securing members including tire guides adapted to be spaced at intervals around the circumference of the front and rear wheels of the vehicle to be transported, bands passing through said tire guides and around said U-bolts, and means for tying the ends of said bands together to form tautly drawn loops around said wheels.

In testimony whereof, we have hereunto signed our names at Altoona, Pennsylvania, this 13th day of November, 1931.

ALOYSIUS NICHOLAS BERGER.
PAUL SEEL.